United States Patent
Hori

[11] Patent Number: 6,141,492
[45] Date of Patent: *Oct. 31, 2000

[54] RECORDING APPARATUS FOR COMPRESSING AND RECORDING MOVING AND STILL IMAGES

[75] Inventor: Taizo Hori, Yokohama, Japan

[73] Assignee: Canon Kabushiki Kaisha, Tokyo, Japan

[ * ] Notice: This patent is subject to a terminal disclaimer.

[21] Appl. No.: 09/383,642

[22] Filed: Aug. 26, 1999

Related U.S. Application Data

[62] Division of application No. 08/787,576, Jan. 22, 1997.

[30] Foreign Application Priority Data

Jan. 25, 1996 [JP] Japan ..................... 8-010932

[51] Int. Cl.[7] ............... H04N 5/225; H04N 5/917
[52] U.S. Cl. ........................... 386/112; 386/120
[58] Field of Search ....................... 386/112, 120, 386/121, 124, 129, 109, 107, 117, 123, 111; 342/220; 360/32; H04N 5/225, 5/917

[56] References Cited
U.S. PATENT DOCUMENTS

| | | | |
|---|---|---|---|
| 4,910,606 | 3/1990 | Kinoshita et al. | 386/120 |
| 5,206,730 | 4/1993 | Sakai | 386/120 |
| 5,659,654 | 8/1997 | Nagasawa et al. | 386/120 |
| 5,991,504 | 11/1999 | Hori | 386/112 |

*Primary Examiner*—Robert Chevalier
*Attorney, Agent, or Firm*—Fitzpatrick, Cella, Harper & Scinto

[57] ABSTRACT

The amount of information in input digital image data is compressed at a first compression ratio and at a second compression ratio which is lower than the first compression ratio and recorded. When a still image is recorded, a still image having a high resolution can be recorded by compressing the digital image data at the second compression ratio and recording it.

15 Claims, 5 Drawing Sheets

RECORDING APPARATUS FOR COMPRESSING AND RECORDING MOVING AND STILL IMAGES

This application is a divisional of parent application Ser. No. 08/787,576 filed Jan. 22, 1997.

BACKGROUND OF THE INVENTION

1. Field of the Invention

The present invention relates to a recording apparatus and, more particularly, to a recording apparatus capable of recording moving and still images.

2. Description of the Related Art

A digital VTR is hitherto known as an apparatus for recording and reproducing video data and sound data as digital data to and from a magnetic tape. In such a digital VTR, when image data for one picture of reproduced moving image data is stored in a memory and this image data for one picture is repeatedly read, the image data can be output as a still image. At this time, image data for one picture might not be satisfactorily reproduced due to errors and drop out in the reproduced data.

Accordingly, in such a VTR, in order to obtain a more satisfactory still image, a method has been considered in which image data is recorded as a still image during recording by repeatedly recording image data for the same picture, stored in memory, on a tape for a plurality of pictures.

On the other hand, concerning a method for performing recording by compressing the amount of information in the image data to be recorded, a method has also been considered in which the amount of information in the image data per unit time is reduced by increasing the compression ratio, making it possible to record for a long period of time though the image quality is deteriorated to a certain degree.

As described above, in the digital VTR, the functions of still image recording and reproduction and recording for a long time period are considered. However, a specific proposal which effectively relates these functions has not yet been made.

SUMMARY OF THE INVENTION

It is an object of the present invention to solve the above-described problems.

It is another object of the present invention to make a specific proposal for effectively relating the function of recording moving and still images to other functions.

It is still another object of the present invention to record still images having a higher resolution.

To this end, according to the present invention, there is provided a recording apparatus, comprising: compression means for compressing the amount of information in input digital image data at a first compression ratio and at a second compression ratio which is lower than the first compression ratio; recording means for recording the digital image data compressed by the compression means; mode setting means for setting the recording mode of the apparatus, the recording mode including a moving image mode for recording moving images and a still image mode for recording still images; and control means for setting the compression ratio of the compression means at the second compression ratio according to the still image mode set by the mode setting means.

According to a further aspect of the present invention, a recording apparatus includes transport means for transporting a recording medium at a first speed and at a second speed which is higher than the first speed. Recording means are provided for forming a large number of tracks on a recording medium transported by the transport means, and for recording thereon digital image data whose amount of information is compressed. Mode setting means set the recording mode of the apparatus, the recording mode including a moving image mode for recording moving images and a still image mode for recording still images. Control means are provided for setting the transport speed of the recording medium at the second speed according to a setting of the still image mode by the mode setting means.

According to another aspect of the present invention, a recording apparatus comprises compression means for compressing an amount of information in input digital image data at a first compression ratio and at a second compression ratio which is lower than the first compression ratio. Transport means are provided for transporting a recording medium at a first transport speed and at a second transport speed which is higher than the first transport speed. Recording means are provided for forming a large number of tracks on a recording medium transported by the transport means, and for recording the digital image data compressed by the compression means, the recording means being capable of recording the image data for one picture on small n tracks and on m tracks (m being greater than n). Mode setting means set a recording mode of the apparatus, the recording mode including a moving image mode for recording moving images and a still image mode for recording still images. Control means are provided for setting the compression ratio at the second compression ratio according to a setting of the still image mode by the mode setting means, for setting the transport speed at the second speed, and for setting the number of tracks on which the image data for one screen is recorded at the m tracks.

According to still another aspect of the present invention, a recording apparatus includes compression means for compressing an amount of information in input digital image data, and manual setting means for manually setting a compression ratio of the compression means. Recording means records the image data compressed by the compression means, and a mode setting means sets the mode of the apparatus to any one of a plurality of modes. The plurality of modes include a first mode in which the compression means compresses the input digital image data at a compression ratio set by the manual setting means and the control means records the compressed digital image data, and a second mode in which the compression means compresses the input digital image data at a predetermined compression ratio regardless of the compression ratio set by the manual setting means and the recording means records the compressed image data.

According to still another aspect of the present invention, a recording apparatus includes input means for inputting digital image data whose amount of information is compressed, and transport means for transporting a recording medium. Recording means are provided for recording the digital image data on a recording medium transported by the transport means, and manual setting means are provided for manually setting the transport speed of the recording medium. Mode setting means are provided for setting the mode of the apparatus to any one of a plurality of modes. The plurality of modes include a first mode in which the transport means transports the recording medium at a transport speed set by the manual setting means and a control means records the digital image data, and a second mode in which the transport means transports the recording medium at a predetermined transport speed regardless of the transport speed set by the manual setting means and a control means records the digital image data.

The above and further objects, aspects and novel features of the invention will become more apparent from the following detailed description when read in connection with the accompanying drawings.

DETAILED DESCRIPTION OF THE PREFERRED EMBODIMENT

The preferred embodiment of the present invention will be described below in detail with reference to the accompanying drawings.

Figure 1:
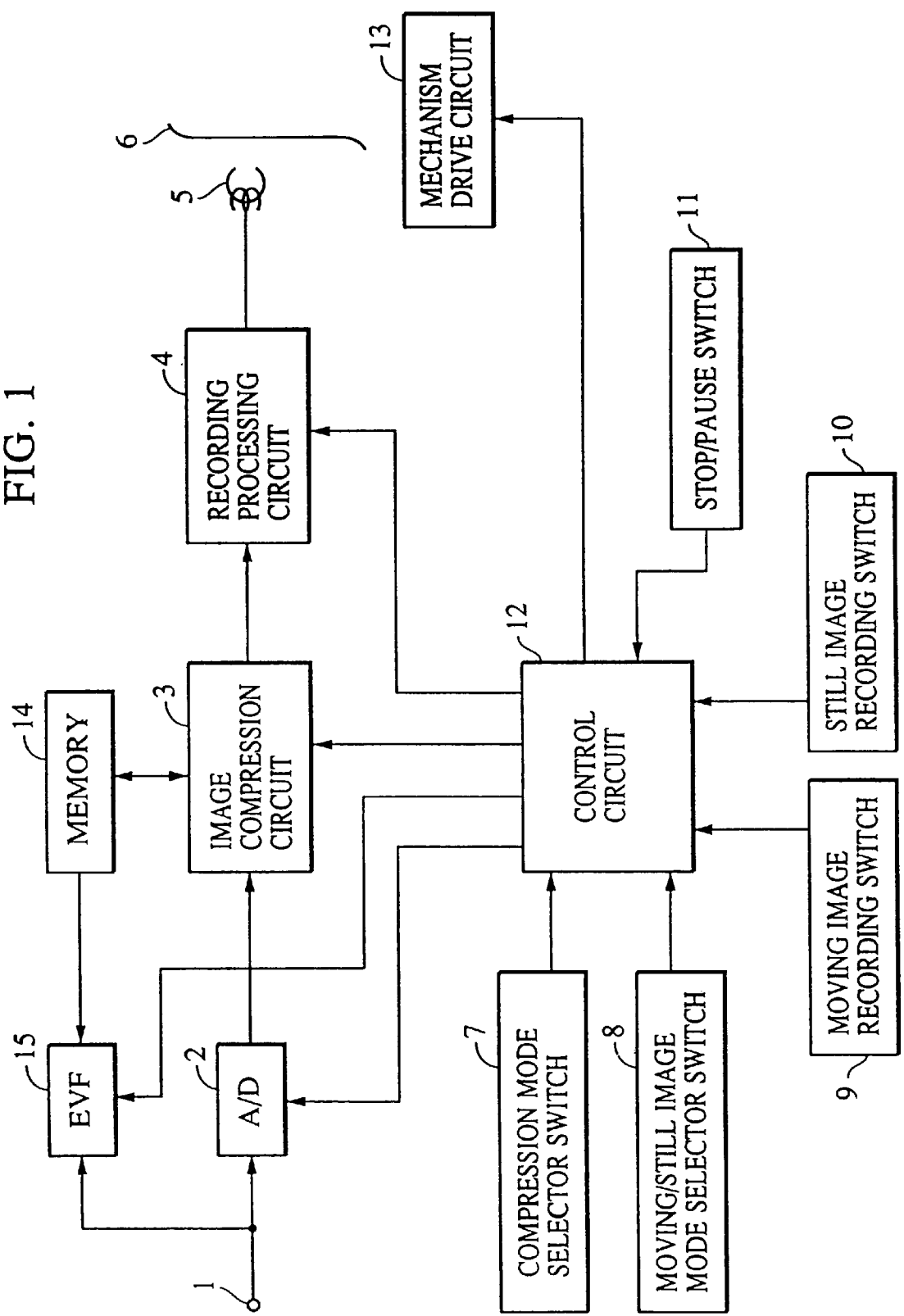
FIG. 1 is a block diagram illustrating the arrangement of a digital VTR according to an embodiment of the present invention.

FIG. 1 is a block diagram illustrating the arrangement of a digital VTR according to an embodiment of the present invention.

The basic recording operation of the digital VTR will be described first. Referring to FIG. 1, image data input from an input terminal 1, obtained by a video camera or the like, is sampled by an A/D converter 2 and converted into a digital signal of a plurality of bits per sample and output to an image compressing circuit 3. The image compressing circuit 3 compresses the amount of information in the image data by a compression ratio corresponding to a compression mode set by a compression mode selector switch 7, as will be described later. To be specific, compression is performed by using conventional technologies, such as DCT (discrete cosine transform), quantization, or variable-length coding. The image data compressed by the image compressing circuit 3 is subjected to error correction coding and a digital modulation process by a recording processing circuit 4, a subcode including data indicating a compression mode and a recording mode is multiplexed onto the image data, as will be described later, and the multiplexed data is converted into a form suitable for magnetic recording and recorded onto a large number of helical tracks formed on a tape 6 by means of a rotary head 5.

Also shown in FIG. 1 is an EVF (electric view finder) 15 which displays an input image and an image related to image data stored in a memory 14 in accordance with an instruction from a control circuit 12.

Next, a description will be given of the recording operation of moving images and still images, and a high compression mode and a low compression mode in this embodiment.

Further shown in FIG. 1 is a compression mode selector switch 7. The control circuit 12 controls the A/D converter 2 and the image compressing circuit 3 according to the mode set by the compression mode selector switch 7 and sets the compression ratio of image data to be recorded.

It is assumed in this embodiment that as these compression modes, there are two types of compression modes, a high compression ratio mode and a low compression ratio mode.

In each mode, the control circuit 12 changes the compression ratio by changing the number of samplings to be performed for each picture in the A/D converter 2 according to a set compression ratio and also by changing a quantization coefficient during quantization in the image compressing circuit 3. More specifically, during a high compression mode in which the compression ratio is high (the amount of information in the image data per unit time is small), the number of samples of the A/D converter 2 is decreased to less than that in a low compression mode, and the quantization coefficient during quantization is set to a value at which quantization is performed more roughly than that in the low compression mode. In this embodiment, the compression ratio during the high compression mode is set to be twice as large as that of the low compression mode. In other words, the amount of information in image data per unit time during the high compression mode is set to be one half of that of the low compression mode.

Further, the control circuit 12 controls a mechanism drive circuit in order to control the transport speed of the tape 6 according to the compression mode. That is, the tape transport speed of the high compression mode is set to be one half of that during the low compression mode.

Furthermore, in this embodiment, the number of tracks on which image data for one frame is recorded is made different for the high compression mode and the low compression mode. More specifically, for this embodiment in the low compression mode, image data for one frame is recorded over 10 tracks, whereas in the high compression mode, image data for one frame is recorded over 5 tracks. Therefore, in the high compression mode, the amount of tape required to record image data for one frame can be set to be one half of that during the low compression mode.

Figure 2:
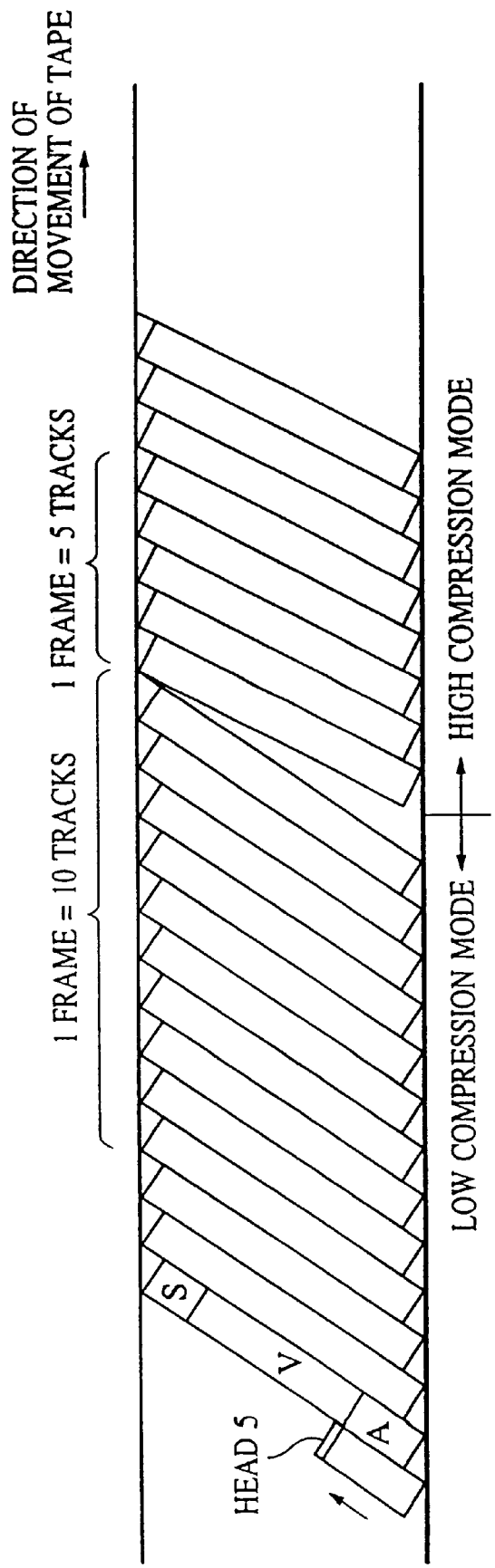
FIG. 2 shows a recording format on a tape in the apparatus shown in FIG. 1.

The state of the recording tracks in each of the above-described compression modes is shown in FIG. 2. Each track shown in FIG. 2 has specific areas A, V and S on which audio data, video data and subcode data are recorded. When image data is recorded in the high compression mode as described above, image quality is poorer than the case in which image data is recorded in the low compression mode, but recording for a long time period is possible.

Next, a description will be given of the moving image/still image mode and the operation of recording moving images and still images.

Shown in FIG. 1 are a moving image/still image mode selector switch 8, a moving image recording switch 9 for providing an instruction to cause recording of moving images, and a still image recording switch 10 for providing an instruction to cause recording of still images.

The moving image/still image mode will be described first.

When the moving image mode is set by the switch 8, the control circuit 12 causes a mechanism drive circuit 13 to start transporting the tape 6 in accordance with an instruction from the moving image recording switch 9 and to start the recording of image data. Further, the control circuit 12 causes the mechanism drive circuit 13 to stop transportation of the tape 6 in accordance with a stop or recording pause instruction from a pause switch 11 in order to stop recording the image data. In the moving image mode, the control circuit 12 continues to transport the tape and records the image data from when an instruction is issued from the moving image recording switch 9 until an instruction is issued from the pause switch 11.

Further, the control circuit 12 can accept an instruction for recording a still image from the still image recording switch 10. More specifically, even while a moving image is being recorded in the moving image mode, when an instruction for recording a still image is received from the still image recording switch 10, the control circuit 12 controls the image compressing circuit 3 in order to repeatedly read image data for one frame stored in the memory 14 for a predetermined period of time, for example, six seconds in this embodiment, and to record the image data on the tape 6. Thereafter, the moving image is recorded again, that is, mutually different screens are recorded in sequence on the tape 6. During this time, the tape 6 continues to be transported at a fixed speed.

Comparatively, when the still image mode is set by the switch 8, the control circuit 12 only accepts instructions from the still image recording switch 10. More specifically, in the still image mode, when an instruction for recording a still image is issued from the still image recording switch 10, the control circuit 12 causes the mechanism drive circuit 13 to transport the tape 6 and controls the image compressing circuit 3 to repeatedly read image data for one frame stored in the memory 14 and record it on the tape 6. Then, the control circuit 12 records a still image for a predetermined period of time, for example, six seconds in this embodiment, on the basis of the internal counter and then controls the mechanism drive circuit 13 in order to stop transporting the tape 6 and to stop recording the image data.

When a still image is being recorded while in the moving image mode or when in the still image mode, subcode data indicating a still image is recorded on each track on which the still image data is being recorded. This subcode data can be used to retrieve a still image during reproduction.

The still image recording switch 10 is formed into a two-stage release type. Upon the first-stage pressing, the control circuit 12 stops the writing of image data into the memory 14 and multiplexes a still image related to the image data read out from the memory 14 onto the input image and displays it on an EVF 15. Then, upon the second-stage pressing, image data for one frame stored in the memory 14 is repeatedly read and recorded in the manner described above. If it is not desired to record the still image stored in the memory upon the first-stage pressing, the switch 10 may be released after the first-stage pressing and before the second-stage pressing.

Referring to the flowchart shown in FIG. 3, a description will be given below of the control of the operation for recording moving images and still images and the operation of setting the compression mode by the control circuit 12 in the apparatus of this embodiment arranged as described above.

Figure 3:
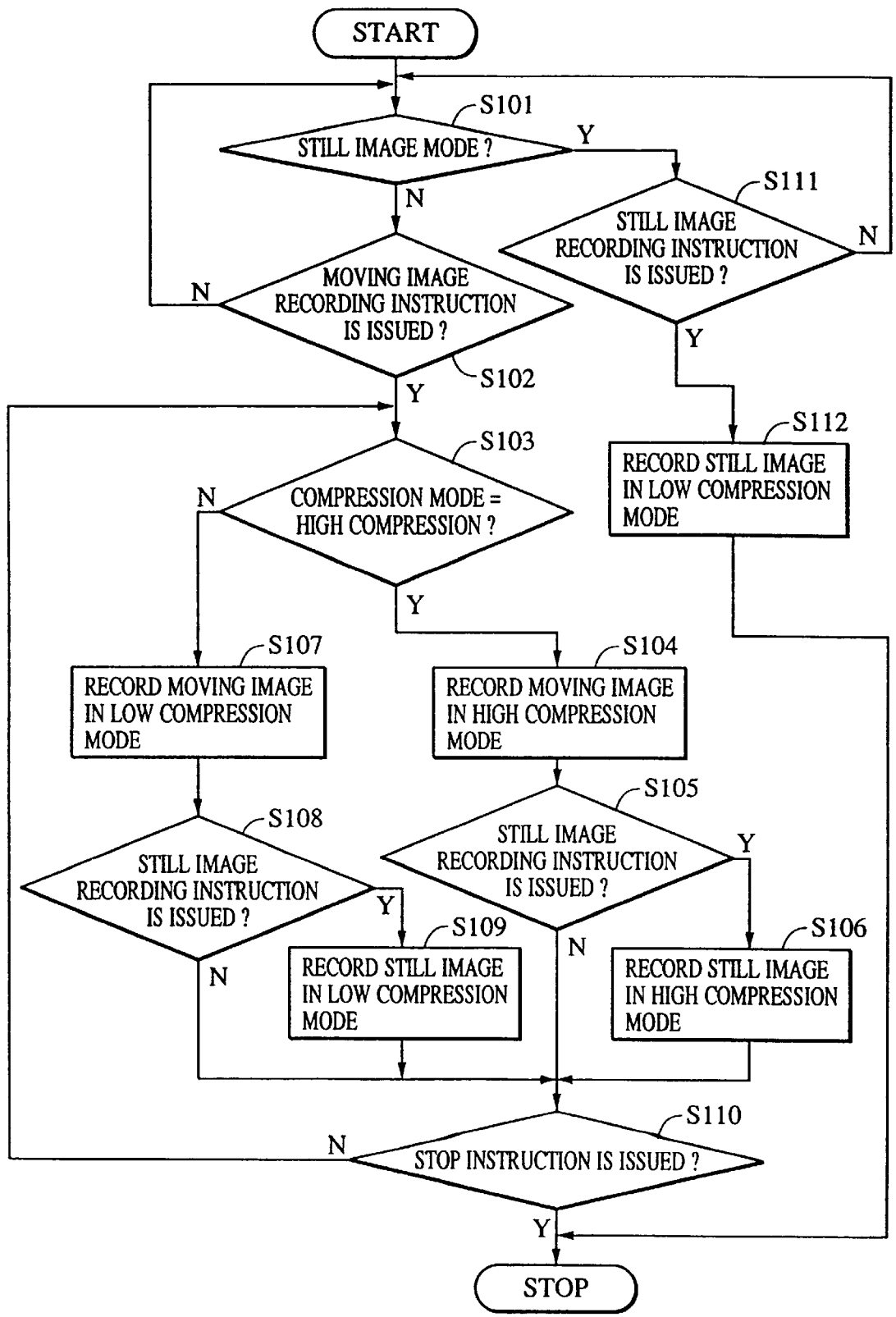
FIG. 3 is a flowchart illustrating an operation of the apparatus shown in FIG. 1.

In FIG. 3, it is initially detected whether the still image mode has been set by the moving image/still image mode selector switch 8 (step S101). If the moving image mode has been set, it waits for a moving image recording instruction from the moving image recording switch 9 (step S102). When the moving image recording instruction is received, it is detected whether the compression mode has been set to a high compression mode by the compression mode selector switch 7 (step S107). If the compression mode has been set to the high compression mode, a process corresponding to the high compression mode is performed as described above to start recording a moving image (step S104), and it waits for a still image recording instruction from the switch 10 (step S105). When a still image recording instruction has been received, a process corresponding to the high compression mode is performed as described above to start recording a still image, and after recording of the still image has been performed for six seconds, a moving image is recorded again.

When the compression mode is a low compression mode, a process corresponding to the low compression mode is performed as described above to record a moving image (step S107). It then waits for a still image recording instruction from the switch 10 (step S108). When the still image recording instruction is received, a process corresponding to the high compression mode is performed as described above to record a still image, and after recording of the still image has been performed for six seconds, a moving image is recorded again.

Recording of the moving image stops in accordance with an instruction from the stop/pause switch 11.

Further, when the still image mode has been set by the moving image/still image mode selector switch 8, it waits for a still image recording instruction from the switch 10 (step S111). When the still image recording instruction from the switch 10 is received, the control circuit 12 performs a process corresponding to the low compression mode on the image data regardless of the compression mode set by the compression mode selector switch 7 and records the image data on a tape 6. After recording of the still image is performed for six seconds, the control circuit 12 stops the tape and stops recording the still image.

Figure 4:
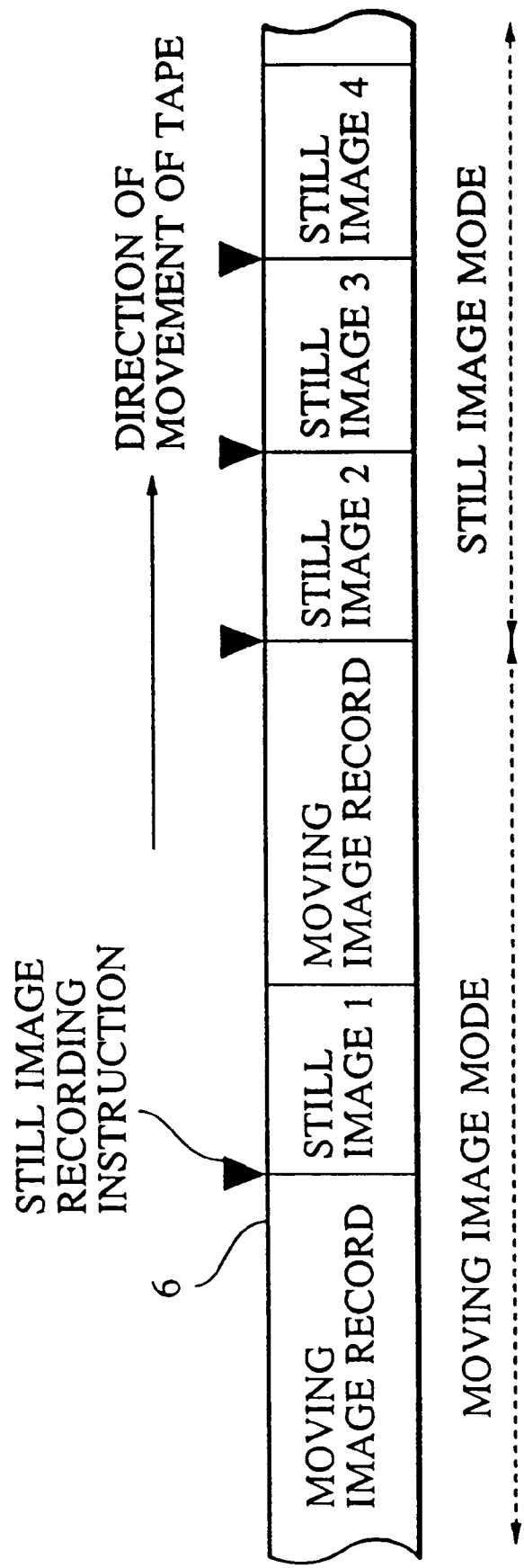
FIG. 4 shows a recording format on a tape in the apparatus shown in FIG. 1.

The state of the tape recorded by the apparatus of this embodiment in the above-described way is shown in FIG. 4.

Although the boundary portion between the moving image and the still image is shown by lines vertical to the length of the tape in FIG. 4, all of these images are recorded on helical tracks such as those shown in FIG. 2, and each boundary, in practice, has a certain angle with respect to the length of the tape.

In this embodiment as described above, when in the still image mode, still images are recorded in the low compression mode regardless of the compression mode set by the compression mode selector switch 7. Therefore, it is possible to obtain still images having higher image quality.

Generally speaking, image data recorded as still images are often printed by video printers or the like. In such cases, if the image data is recorded, for example, in the high compression mode, the image quality is deteriorated.

In this embodiment, in the still image mode, recording is performed in the low compression mode, so still images having high image quality can be obtained even when the image data is used in printing as described above.

Further, since the recording time of still images is shorter than the recording time of moving images, even if in the still image mode image data is recorded in the low compression mode, the amount of tape consumed does not greatly increase.

Further, in this embodiment, when still images are recorded while in the moving image mode, the still images are recorded in the compression mode in which the moving images were being recorded.

In the case where, for example, a moving image is being recorded in the high compression mode and a still image is recorded in the low compression mode, it is difficult to accurately control the tape transport mechanism, such as capstans, because the tape transport speed is different for these modes and the image in the boundary portion between the moving images and still images is distorted.

More specifically, as in this embodiment, by setting the compression mode (the mode set by the compression mode selector switch 7) to be the same as the compression mode of the moving image even if a still image recording instruction is received while in the moving image mode, such distortion in the recorded image can be eliminated.

Although in this embodiment two types of modes, a high compression mode and a low compression mode, are set as compression modes, three or more types of compression modes may be set. In such a case, image data is recorded at the lowest compression ratio in the still image mode. Also, since the amount of information in the image data for each frame differs depending upon the compression ratio, the number of tracks on which image data for one frame i s recorded and the tape transport speed vary according to the compression ratio.

Although a stop/pause switch 11 is provided in addition to the moving image recording switch, the moving image recording switch may be used to serve as both switches.

Although the description of sound data is omitted, both the sound data and the image data may be recorded in the moving image/still image mode. In such cases, these data are separately recorded in the image data recording area and the sound data recording area in each track.

In the above-described embodiment, a case is described in which a moving image still image mode selector switch is provided. In the following embodiment, a case will be described in which such a moving image/still image mode selector switch is not provided.

Figure 5:
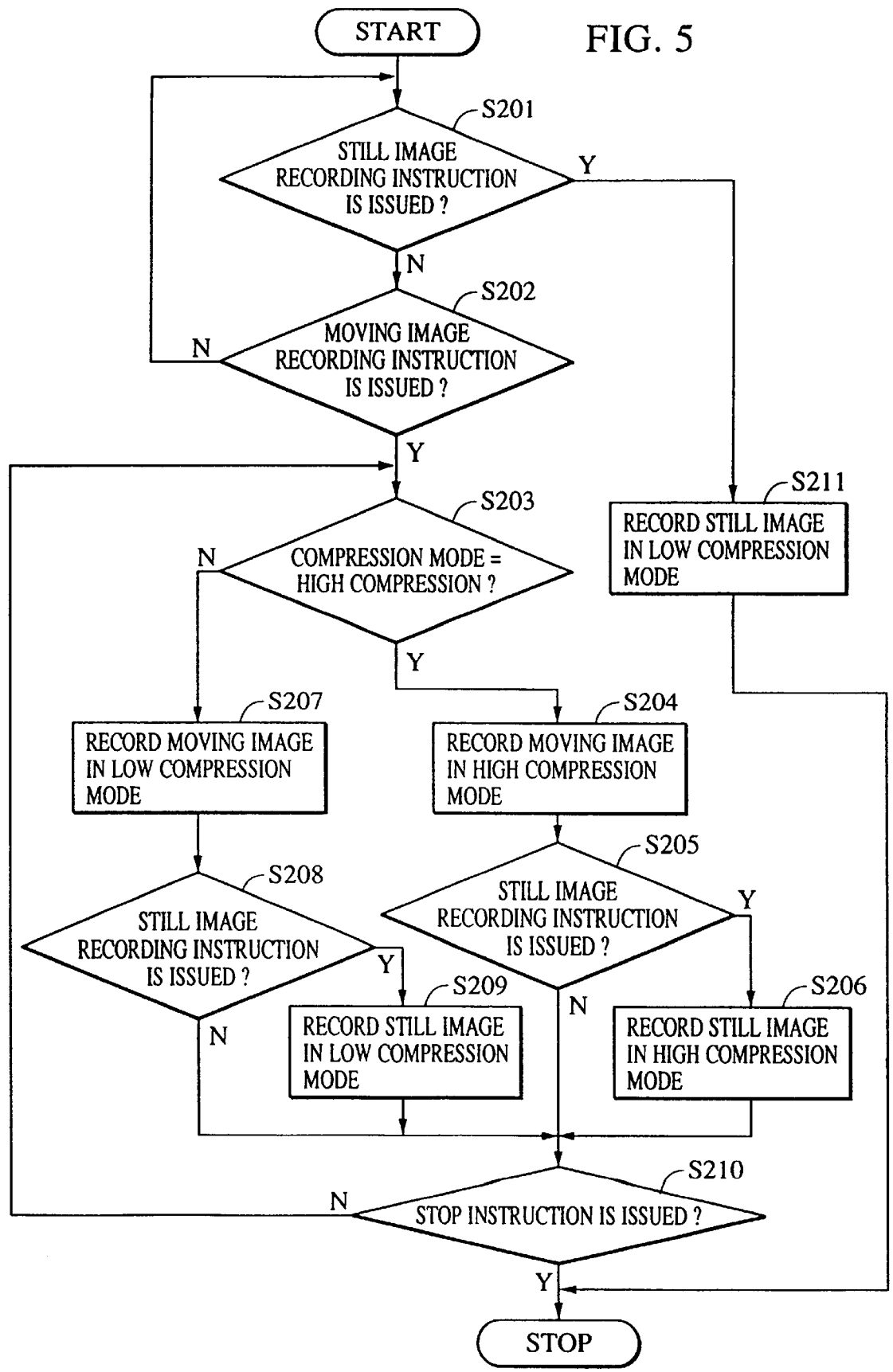
FIG. 5 is a flowchart illustrating the other operation of the apparatus shown in FIG. 1.

FIG. 5 is a flowchart illustrating the operation of the control circuit 12 in this embodiment.

Initially, it is detected whet her a still image recording instruction has been received from the still image recording switch 10 in the stop or pause state (step S201). If the still image recording instruction has been received, a process corresponding to the low compression mode is performed on image data regardless of the compression mode set by the compression mode selector switch 7, and the image data is recorded on the tape 6. Then, after the still image has been recorded for six seconds, recording and transportation of the tape is stopped (step S211).

When no still image recording instruction has been received in the stop or pause state, it is detected whether a moving image recording instruction from the moving image recording switch 9 has been received (step S202). If the moving image recording instruction has been received, the compression mode set by the compression mode selector switch 7 is detected as in the above-described embodiment, and a process corresponding to each mode is performed (step S203). Hereinafter, the operations from step S204 to S209 are the same as the operations from step S104 to S109.

As described above, in this embodiment, still images are recorded in the low compression mode when a still image recording instruction is received in the stop or pause state, so satisfactory still images can be recorded.

Although the above-described embodiment describes a case in which the present invention is applied to digital VTRs, in addition to this example, the present invention may be applied to an apparatus for recording image signals onto other recording media such as magnetic disks, optomagnetic disks, or semiconductor memories, and has similar advantages.

As is clear from the above description, it is possible to compress images at the most appropriate compression ratio and record them by setting a compression ratio according to the image to be recorded when moving images and still images are recorded.

Also, it is possible to record the most appropriate amount of information by determining the amount of information for each screen according to the image to be recorded when moving images and still images are recorded.

Further, it is possible to record image data at the most appropriate tape transport speed by setting the tape transport speed according to the image to be recorded when moving images and still images are recorded.

In addition, it becomes possible to effectively relate the amount of information in image data to be recorded and the amount of recording media consumed to the quality of reproduced images.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A recording apparatus comprising:

analog-to-digital converter means for sampling and converting input image data into digital image data, said converter means outputting a first sampled image data having a first number of samples for one frame and a second sampled image data having a second number of samples which is greater than the first number of samples for one frame;

compression means for compressing an amount of information in the digital image data converted by said converter means, said compression means outputting a first compressed image data having a first information amount for one frame by compressing the first sampled image data, and a second compressed image data having a second information amount which is greater than the first information amount for one frame by compressing the second sampled image data;

recording means for recording the image data compressed by said compression means on a recording medium, said recording means selectively recording the first compressed image data and the second compressed image data;

mode setting means for setting a recording mode of said apparatus, said apparatus having a moving image mode for recording moving images and a still image mode for recording still images; and control means for, in response to a setting of the still image mode by said mode setting means, controlling said compression means and said recording means so that said compression means outputs the second compressed image data and said recording means records the second compressed image data.

2. Apparatus according to claim 1, further comprising imaging means for generating image data and outputting the image data as the input image data.

3. Apparatus according to claim 1, wherein said recording means records the image data representing the moving images and audio data, in the moving image mode.

4. Apparatus according to claim 1, further comprising display means for displaying an image representative of the input image data.

5. Apparatus according to claim 1, further comprising manual selection means for selecting the image data to be recorded by said recording means in the moving image mode between the first compressed image data and the second compressed image data.

6. Apparatus according to claim 1, wherein the recording medium comprising a magnetic tape.

7. Apparatus according to claim 1, wherein the recording medium comprises a semiconductor memory.

8. Apparatus according to claim 1, wherein said mode setting means comprises a mode setting switch for setting the recording mode.

9. A recording apparatus comprising:

analog-to-digital converter means for sampling and converting input image data into digital image data, said converter means outputting a first sampled image data having a first number of samples for one frame and a second sampled image data having a second number of samples which is greater than the first number of samples for one frame;

compression means for compressing an amount of information in the digital image data converted by said converter means, said compression means outputting a first compressed image data having a first information amount for one frame by compressing the first sampled image data, and a second compressed image data having a second information amount which is greater than the first information amount for one frame by compressing the second sampled image data;

recording means for recording the image data compressed by said compression means, said recording means selectively recording the first compressed image data and the second compressed image data;

mode setting means for setting a recording mode of said apparatus, said apparatus having a moving image mode for recording moving images and a still image mode for recording still images; and control means for, in response to a setting of the still image mode by said mode setting means, controlling said compression means and said recording means so that said compression means outputs the second compressed image data and said recording means records the second compressed image data.

10. Apparatus according to claim 9, further comprising imaging means for generating image data and outputting the image data as the input image data.

11. A recording apparatus comprising:

compression means for compressing an amount of information in input digital image data;

recording means for recording the digital image data compressed by said compression means;

manual setting means for manually setting an information amount of the digital image data for one frame output from said compression means; and mode setting means for setting a mode of said apparatus to any one of a plurality of modes, said plurality of modes including a first mode in which said compression means outputs the digital image data having the information amount set by said manual setting means and said recording means records the compressed digital image data, and a second mode in which said compression means outputs the digital image data having a predetermined information amount for one picture regardless of the information amount set by said manual setting means and said recording means records the compressed digital image data.

12. Apparatus according to claim 11, further comprising imaging means for generating image data and outputting the image data as the input digital image data.

13. A recording apparatus comprising:

compression means for compressing an amount of information in input digital image data;

recording means for recording the digital image data compressed by said compression means;

manual setting means for manually setting an image quality of the digital image data output from said compression means; and mode setting means for setting a mode of said apparatus to any one of a plurality of modes, said plurality of modes including a first mode in which said compression means outputs the digital image data having the image quality set by said manual setting means and said recording means records the compressed digital image data, and a second mode in which said compression means outputs the digital image data having a predetermined image quality regardless of the image quality set by said manual setting means and said recording means records the compressed digital image data.

14. Apparatus according to claim 13, further comprising imaging means for generating image data and outputting the image data as the input image data.

15. A recording apparatus comprising:

analog-to-digital converter means for sampling and converting input image data into digital image data, said converter means outputting a first sampled image data having a first number of samples for one frame and a second sampled image data having a second number of samples which is greater than the first number of samples for one frame;

compression means for compressing an amount of information in the digital image data converted by said converter means, said compression means outputting a first compressed image data having a first information amount for one frame by compressing the first sampled image data, and a second compressed image data having a second information amount which is greater than the first information amount for one frame by compressing the second sampled image data;

output means for outputting the image data compressed by said compression means to a recording means, said output means selectively outputting the first compressed image data and the second compressed image data;

mode setting means for setting a recording mode of said apparatus, said apparatus having a moving image mode for recording moving images and a still image mode for recording still images; and control means for, in response to a setting of the still image mode by said mode setting means, controlling said compressing means and said output means so that said compression means outputs the second compressed image data and said output means outputs the second compressed image data to the recording means.

* * * * *